US012287070B1

(12) United States Patent
Yu et al.

(10) Patent No.: US 12,287,070 B1
(45) Date of Patent: Apr. 29, 2025

(54) LED FILAMENT LIGHT BULB

(71) Applicant: MUSTAR LIGHTING CORPORATION, Zhubei (TW)

(72) Inventors: Chih-Ming Yu, Jhubei (TW); Yu-Hsueh Lin, Puyan Township (TW); Pei-Rou Lin, Dacun Township (TW); Yu-Xuan Huang, Puxin Township (TW)

(73) Assignee: MUSTAR LIGHTING CORPORATION, Zhubei (TW)

( * ) Notice: Subject to any disclaimer, the term of this patent is extended or adjusted under 35 U.S.C. 154(b) by 0 days.

(21) Appl. No.: 18/761,086

(22) Filed: Jul. 1, 2024

(30) Foreign Application Priority Data

Nov. 30, 2023 (TW) ................................ 112146674

(51) Int. Cl.
*F21K 9/232* (2016.01)
*F21K 9/238* (2016.01)
*F21V 29/70* (2015.01)
*F21Y 103/10* (2016.01)
*F21Y 115/10* (2016.01)

(52) U.S. Cl.
CPC .............. *F21K 9/232* (2016.08); *F21K 9/238* (2016.08); *F21V 29/70* (2015.01); *F21Y 2103/10* (2016.08); *F21Y 2115/10* (2016.08)

(58) Field of Classification Search
CPC .......... F21K 9/232; F21K 9/238; F21V 29/70; F21Y 2115/10; F21Y 2103/10
See application file for complete search history.

(56) References Cited

U.S. PATENT DOCUMENTS 2,277,776 A * 3/1942 Patton ........................ F21K 5/02 431/360
2010/0219734 A1* 9/2010 Lenk ....................... F21K 9/232 313/35

(Continued)

FOREIGN PATENT DOCUMENTS

CN 207702161 U 8/2018
CN 107869655 B 7/2020
CN 213118562 U 5/2021

(Continued)

OTHER PUBLICATIONS

Search Report appended to an Office Action, which was issued to Taiwanese counterpart application No. 112146674 by the TIPO on Mar. 15, 2024, with an English translation thereof (2 pages).

*Primary Examiner* — Thomas M Sember
(74) *Attorney, Agent, or Firm* — HSML P.C.

(57) ABSTRACT

An LED filament light bulb includes a bulb base, a driving circuit module mounted to the bulb base and including two electrical contacts, a bulb member, a light-emitting unit, and a first heat dissipation gel. The light-emitting unit includes at least two light-emitting strip modules, each including first and second conductive tabs. The first conductive tab of one light-emitting strip module is electrically connected to the second conductive tab of another light-emitting strip module. The second conductive tab of the one light-emitting strip module and the first conductive tab of the another light-emitting strip module are electrically and respectively connected to the electrical contacts. The first heat dissipation gel is disposed between the bulb member and the bulb base, and covers at least a portion of the driving circuit module.

12 Claims, 14 Drawing Sheets

(56) References Cited

U.S. PATENT DOCUMENTS

| | | | |
|---|---|---|---|
| 2019/0162370 | A1 | 5/2019 | Jiang et al. |
| 2019/0338892 | A1 | 11/2019 | Spehalski et al. |

FOREIGN PATENT DOCUMENTS

| | | | |
|---|---|---|---|
| CN | 213272095 | U | 5/2021 |
| JP | 2012182085 | A | 9/2012 |
| JP | 2014508389 | A | 4/2014 |
| TW | M581177 | U | 7/2019 |

* cited by examiner

LED FILAMENT LIGHT BULB

CROSS-REFERENCE TO RELATED APPLICATION

This application claims priority to Taiwanese Invention Patent Application No. 112146674, filed on Nov. 30, 2023, the entire disclosure of which is incorporated by reference herein.

FIELD

The disclosure relates to a lighting device, and more particularly to a light-emitting diode (LED) filament light bulb.

BACKGROUND

Referring to FIG. 1, a conventional light-emitting diode (LED) filament light bulb disclosed in Chinese Patent Application Publication No. CN 107869655 B includes a lamp base 11, a lamp housing 12 connected to the lamp base 11, a core column 13 extending into the lamp housing 12, a plurality of LED light filaments 14 connected to and surrounding the core column 13, and a power source 15 electrically connected to the LED light filaments 14. To manufacture the conventional LED filament light bulb, the power source 15, the LED light filaments 14, and the core column 13 are first connected together and are brought to extending into the lamp housing 12. Then, a protective gas is introduced into a space within the lamp housing 12, and a hot melt process is performed to seal a junction between the lamp base 11 and the lamp housing 12.

Although heat generated by the conventional LED filament light bulb is dissipated by the protective gas, it is troublesome to fill the protective gas into the lamp housing 12 and to seal the lamp housing 12, which adversely affects a production rate of the conventional LED filament light bulb. In addition, the core column 13 serving as a support for the LED light filaments 14 is necessary in the conventional LED filament light bulb, which causes a relatively complicated structure.

SUMMARY

Therefore, an object of the disclosure is to provide a light-emitting diode (LED) filament light bulb that can alleviate at least one of the drawbacks of the prior art.

According to the disclosure, an LED filament light bulb includes a bulb base, a driving circuit module, a bulb member, a light-emitting unit, and a first heat dissipation gel. The bulb base defines a chamber having an upper opening, and includes a first electrode and a second electrode. The driving circuit module is mounted to the bulb base, is electrically connected to the first electrode and the second electrode, and has at least two electrical contacts. The bulb member is mounted to the bulb base, defines a lighting space adapted for accommodating air therein, and has a lower opening in spatial communication with the lighting space and aligned with the upper opening of the bulb base. The light-emitting unit is electrically connected to the driving circuit module, extends into the lighting space, and includes at least two light-emitting strip modules. Each of the at least two light-emitting strip modules includes a plurality of LED lighting strips that are spaced apart from each other and that are disposed in the lighting space, a first conductive tab that is connected to a first end portion of each of the LED lighting strips, and a second conductive tab that is connected to a second end portion of each of the LED lighting strips. The first conductive tab of one of the at least two light-emitting strip modules is fixedly and electrically connected to the second conductive tab of another one of the at least two light-emitting strip modules. The second conductive tab of the one of the at least two light-emitting strip modules is electrically connected to one of the at least two electrical contacts. The first conductive tab of the another one of the at least two light-emitting strip modules is electrically connected to another one of the at least two electrical contacts. The first heat dissipation gel is disposed between the bulb member and the bulb base, is filled in at least a portion of the upper opening and the lower opening, covers at least a portion of the driving circuit module, and is for electrical insulation.

According to another aspect of the present disclosure, a light-emitting diode (LED) filament light bulb includes a bulb base, a driving circuit module, a bulb member, a light-emitting unit, and a first heat dissipation gel. The bulb base defines a chamber having an upper opening, and includes a first electrode and a second electrode. The driving circuit module is mounted to the bulb base, is electrically connected to the first electrode and the second electrode, and has at least two electrical contacts. The bulb member is mounted to the bulb base, defines a lighting space adapted for accommodating air therein, and has a lower opening in spatial communication with the lighting space and aligned with the upper opening of the bulb base. The light-emitting unit is electrically connected to the driving circuit module, extends into the lighting space, and includes at least two light-emitting strip modules and an upper light-emitting module. The upper light-emitting module is disposed higher than the at least two light-emitting strip modules in an up-down direction. Each of the at least two light-emitting strip modules includes a plurality of LED lighting strips that are spaced apart from each other and that are disposed in the lighting space, a first conductive tab that is connected to a first end portion of each of the LED lighting strips, and a second conductive tab that is connected to a second end portion of each of the LED lighting strips. The first conductive tab of one of the at least two light-emitting strip modules and the second conductive tab of another one of the at least two light-emitting strip modules are fixedly and respectively connected to opposite sides of the upper light-emitting strip module and are electrically connected to each other. The second conductive tab of the one of the at least two light-emitting strip modules is electrically connected to one of the at least two electrical contacts. The first conductive tab of the another one of the at least two light-emitting strip modules is electrically connected to another one of the at least two electrical contacts. The first heat dissipation gel is disposed between the bulb member and the bulb base, is filled in at least a portion of the upper opening and the lower opening, covers at least a portion of the driving circuit module, and is for electrical insulation.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
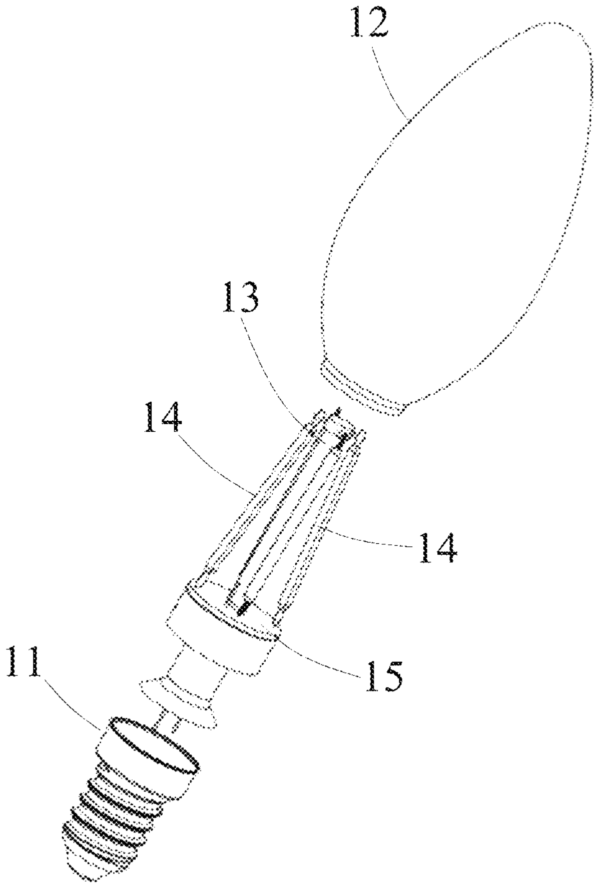
FIG. 1 PRIOR ART
FIG. 1 is a partly exploded perspective view of a conventional light-emitting diode (LED) filament light bulb disclosed in Chinese Patent Application Publication No. CN 107869655 B.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
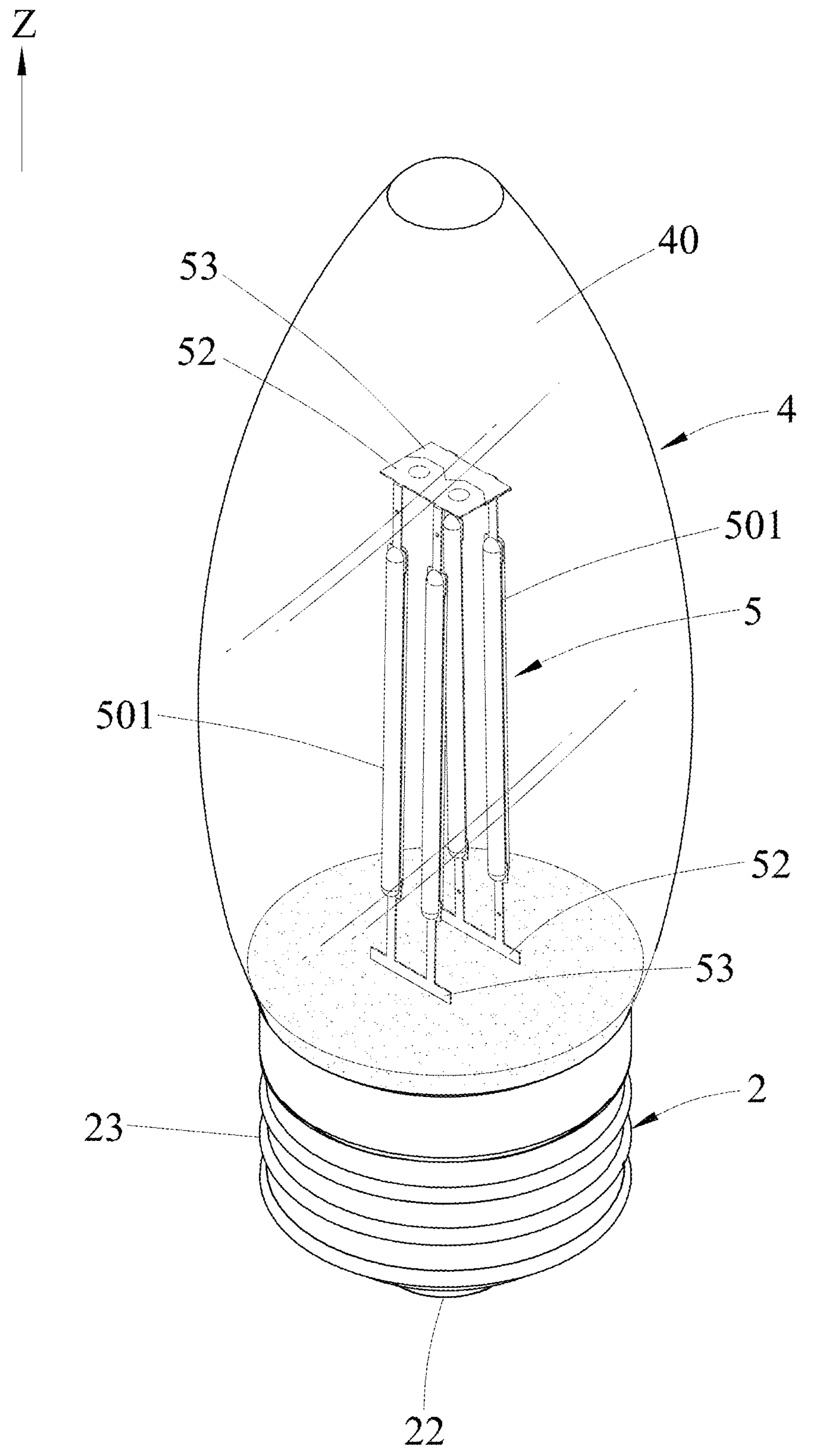
FIG. 2 is a perspective view of a first embodiment of an LED filament light bulb according to the present disclosure.
Figure 3:
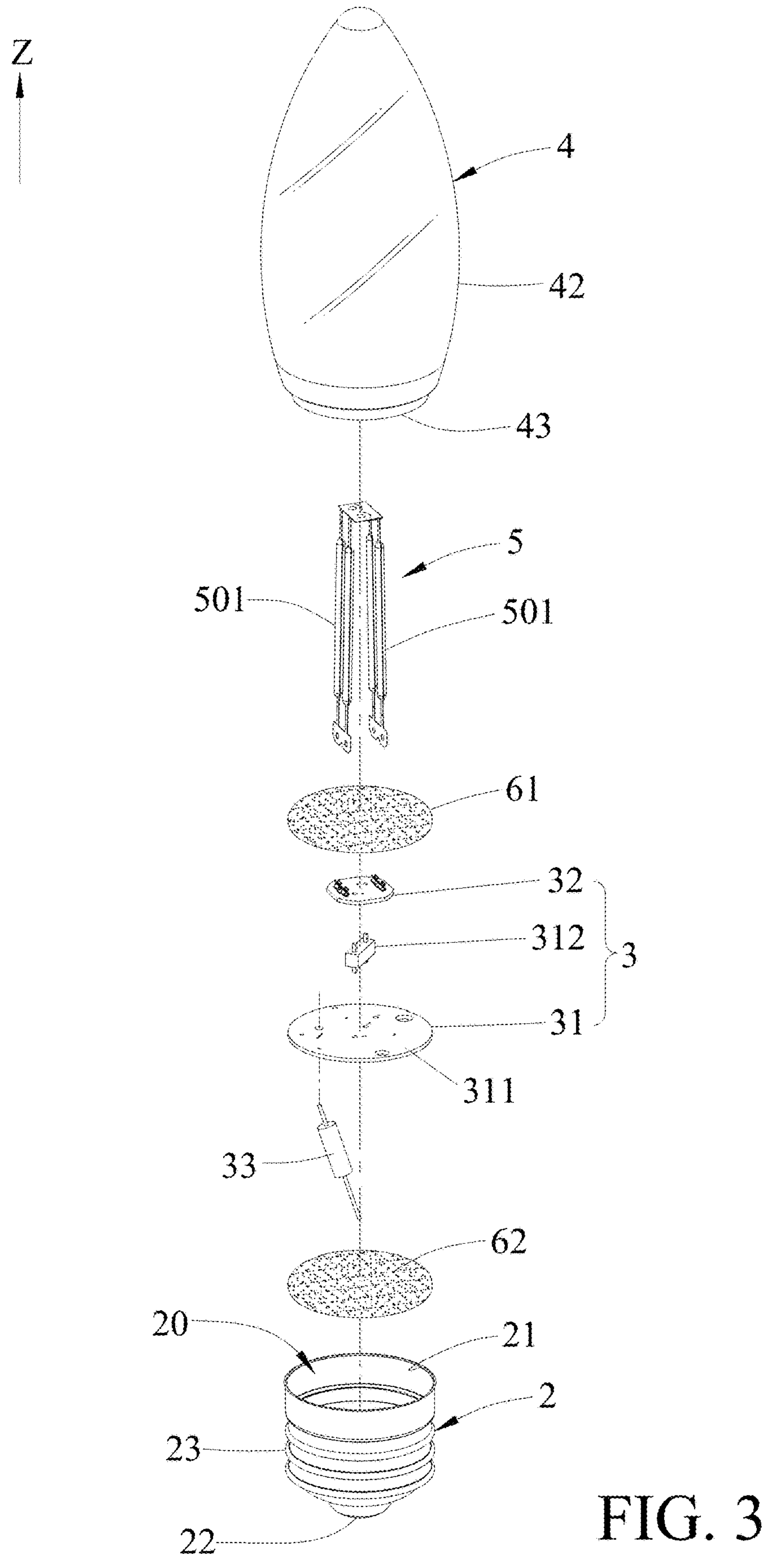
FIG. 3 is an exploded perspective view of the first embodiment.
Figure 4:
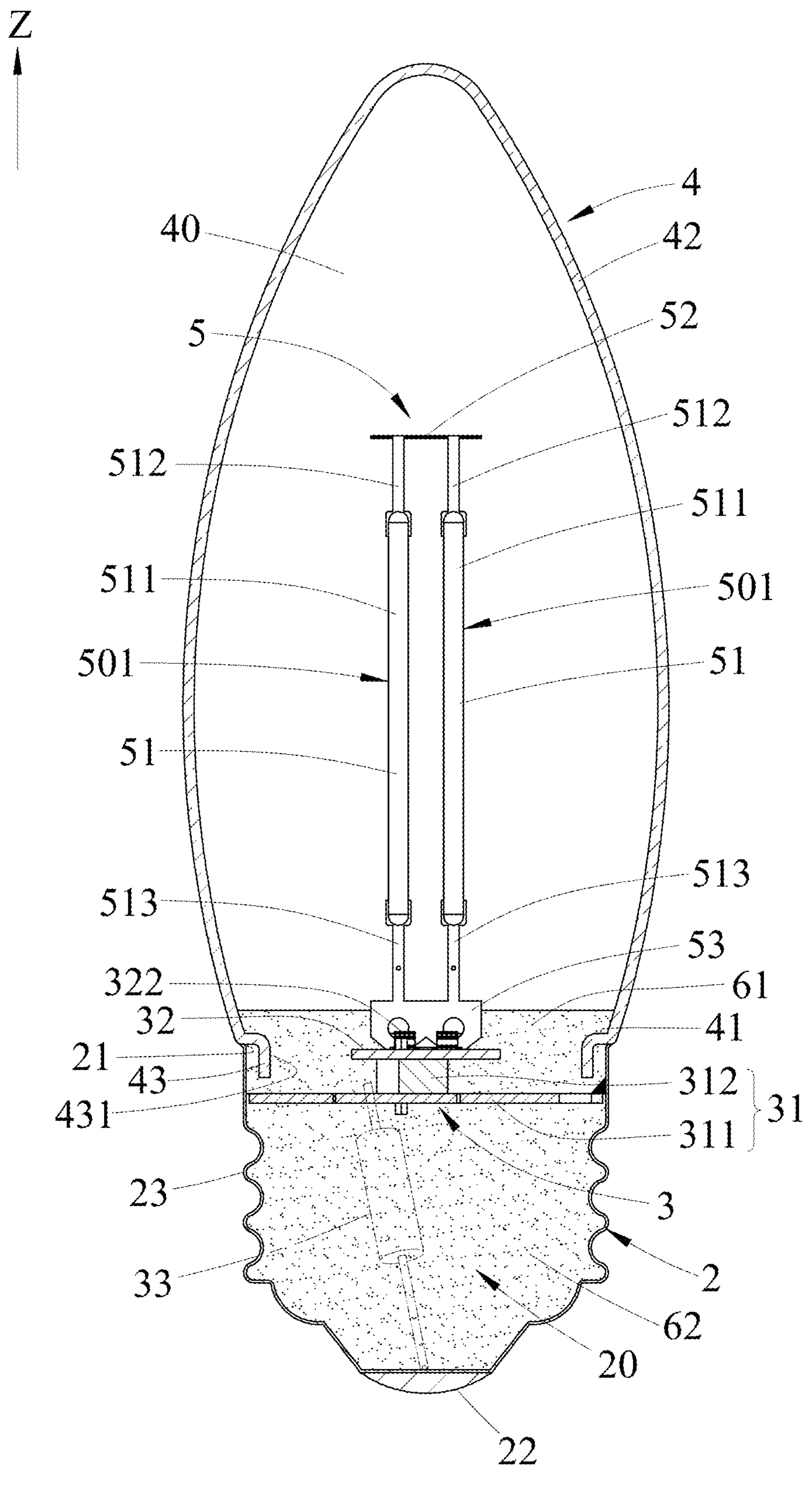
FIG. 4 is a sectional view of the first embodiment.

Referring to FIGS. 2 to 4, a first embodiment of a light-emitting diode (LED) filament light bulb according to the present disclosure includes a bulb base 2, a driving circuit module 3, a bulb member 4, a light-emitting unit 5, a first heat dissipation gel 61, and a second heat dissipation gel 62.

The bulb base 2 surrounds and defines a chamber 20 having an upper opening 21, and includes a first electrode 22 and a second electrode 23. The upper opening 21 opens upwardly in an up-down direction (Z). The first electrode 22 is a protrusion and the second electrode 23 is a metal shell.

The driving circuit module 3 is mounted to the bulb base 2, and is electrically connected to the first electrode 22 and the second electrode 23. In the first embodiment, the driving circuit module 3 includes a driving circuit board 31 electrically connected to the first electrode 22 and the second electrode 23, and an adapter board 32 electrically connected to the driving circuit board 31. The adapter board 32 and the driving circuit board 31 are arranged in the up-down direction (Z). The driving circuit board 31 is disposed in the chamber 20, and includes a circuit board body 311 and an insert member 312 inserted into the circuit board body 311. The circuit board body 311 is electrically connected to the first electrode 22 through an electronic component 33. The circuit board body 311 is electrically connected to the second electrode 23 through tin solder paste and is soldered directly on an inner surface of the bulb base 2. The electronic component 33 may be a resistor or a metal wire. In some embodiments, a top point of the circuit board body 311 is higher than the bulb base 2 in the up-down direction (Z).

Figure 5:
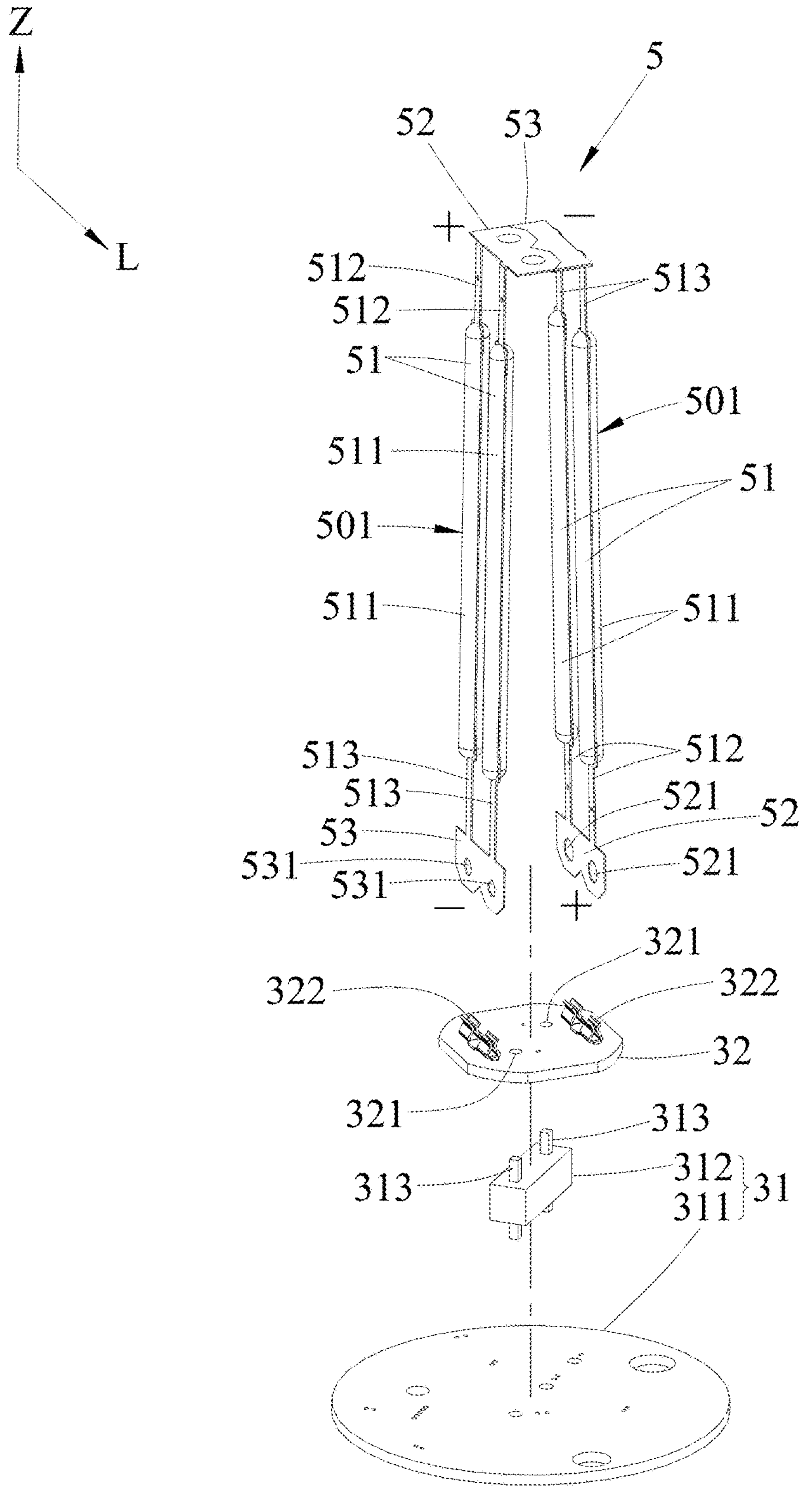
FIG. 5 is an exploded perspective view of a driving circuit module and a light-emitting unit of the first embodiment.

Referring to FIGS. 4 and 5, the insert member 312 has two spaced-apart conductive pillars 313. The adapter board 32 has two spaced-apart insert holes 321 respectively for insertion of the conductive pillars 313 therethrough, and two spaced-apart electrical contacts 322 electrically and respectively connected to the conductive pillars 313. The electrical contacts 322 are electrically connected to the circuit board body 311 through the conductive pillars 313, so the electrical contacts 322 are electrically connected to the first electrode 22 and the second electrode 23 of the bulb base 2.

In the first embodiment, each of the electrical contacts 322 is a conductive fixing clip. In other embodiments, each of the electrical contacts 322 may be a metal pad, such as a copper pad or a silver pad.

Referring to FIGS. 2 to 4, the bulb member 4 is configured to have a candlelight shape, is mounted to the bulb base 2, and surrounds and defines a lighting space 40 therein. In some embodiments, the bulb member 4 and the bulb base 2 are connected fixedly by an adhesive. In some embodiments, the bulb member 4 may be connected fixedly to the bulb base 2 through ultrasonic welding or mechanical means, such as rivets and threadedly engaging components. The bulb member 4 is formed of glass as one piece, and includes a lower shoulder wall 41, a surrounding wall 42 encircling the lower shoulder wall 41 and extending upwardly in the up-down direction (Z), and a flange 43 extending from the lower shoulder wall 41 in a direction opposite to the surrounding wall 42. The flange 43 has a lower opening 431 that is in spatial communication with the lighting space 40 and that is aligned with the upper opening 21 of the bulb base 2 in the up-down direction (Z). The upper opening 21 has a size larger than an outer diameter of the flange 43, so that the flange 43 extends into the upper opening 21 of the bulb base 2. The lower shoulder wall 41 abuts against a top side of the bulb base 2. The lighting space 40 is adapted for accommodating air therein. In some embodiments, the configurations of an upper portion of the bulb base 2 and a lower portion of the bulb member 4 are interchangeable such that the upper portion of the bulb base 2 extends into the lower opening 431 of the flange 43. In the first embodiment, the bulb member 4 has a closed end. In other embodiments, the bulb member 4 may be opened at an upper portion thereof.

The light-emitting unit 5 is electrically connected to the driving circuit module 3 and extends into the lighting space 40. In the first embodiment, the light-emitting unit 5 includes two light-emitting strip modules 501. Each of the light-emitting strip modules 501 includes two LED lighting strips 51 spaced apart from each other and disposed in the lighting space 40, a first conductive tab 52 integrally connected to one end of each of the LED lighting strips 51, and a second conductive tab 53 integrally connected to another end of each of the LED lighting strips 51. In this embodiment, the light-emitting unit 5 includes four LED lighting strips 51. Each of the LED lighting strips 51 is substantially parallel to the up-down direction (Z).

Referring to FIGS. 2, 4 and 5, specifically, each of the first conductive tab 52 and the second conductive tab 53 of each of the light-emitting strip modules 501 has a plurality of through holes 521, 531 spaced apart in a frame direction (L) transverse to the up-down direction (Z). Each of the light-emitting strip modules 501 is cut from a row of identical LED lighting strips 51 with the number of the LED lighting strips 51 contained therein that is determined as required. For each of the light-emitting strip modules 501, each of the LED lighting strips 51 has a luminous body 511 configured to emit light, a first end portion 512 connected to one end of the luminous body 511, and a second end portion 513 connected to an opposite end of the luminous body 511. For each of the light-emitting strip modules 501, the first conductive tab 52 and the first end portion 512 of each of the LED lighting strips 51 are formed of a single metal sheet, and the second conductive tab 53 and the second end portion 513 of each of the LED lighting strips 51 are formed of a single metal sheet. In some embodiments, for each of the light-emitting strip modules 501, the first conductive tab 52 and the second conductive tab 53 are separated and independent metal sheets that are respectively welded to the first end portion 512 and the second end portion 513 of each of the LED lighting strips 51.

The first conductive tab 52 of one of the light-emitting strip modules 501 is fixedly and electrically connected to the second conductive tab 53 of another one of the light-emitting strip modules 501. The second conductive tab 53 of the one of the light-emitting strip modules 501 is electrically connected to one of the electrical contacts 322, and the first conductive tab 52 of the another one of the light-emitting strip modules 501 is electrically connected to another one of the electrical contacts 322. Specifically, the first conductive tab 52 of the one of the light-emitting strip modules 501 and the second conductive tab 53 of the another one of the light-emitting strip modules 501 are overlapped to and welded to each other. The second conductive tab 53 of the one of the light-emitting strip modules 501 and the first conductive tab 52 of the another one of the light-emitting strip modules 501 are respectively inserted into the electrical contacts 322 of the adapter board 32 so as to be in electrical connection with the adapter board 32. Additionally, the electrical contacts 322 may be respectively welded to the second conductive tab 53 of the one of the light-emitting strip modules 501 and the first conductive tab 52 of the another one of the light-emitting strip modules 501 for enhancing the connection thereamong. For each of the light-emitting strip modules 501, the first conductive tab 52 serves as an anode terminal and the second conductive tab 53 serves as a cathode terminal, such that the anode terminals and the cathode terminals of the light-emitting strip modules 501 are in series connection.

In some embodiments, the two LED lighting strips 51 of each of the light-emitting strip modules 501 extend in the up-down direction (Z) and are arranged in the up-down direction (Z).

In the present disclosure, by virtue of the first conductive tab 52 of the one of the light-emitting strip modules 501 and the second conductive tab 53 of the another one of the light-emitting strip modules 501 being connected fixedly to each other, the light-emitting strip modules 501 can stand firmly on the driving circuit module 3 without being supported by a core column as disclosed in the abovementioned conventional LED filament light bulb, so the structure of the present disclosure is relative simple.

In some embodiments, the adapter board 32 is omitted, the conductive pillars 313 of the insert member 312 are modified as insertion slots, and the light-emitting strip modules 501 are directly inserted into the insert member 312. In some embodiments, the adapter board 32 and the insert member 312 are omitted, and the light-emitting strip modules 501 are directly and fixedly welded to the circuit board body 311, which also establishes an electrical connection therebetween.

The first heat dissipation gel 61 is for heat dissipation and electrical insulation, is disposed between the bulb member 4 and the bulb base 2, is filled in at least a portion of each of the upper opening 21 and the lower opening 431, and covers at least a portion of the driving circuit module 3. In some embodiments, the first heat dissipation gel 61 is fully filled in the upper opening 21 and the lower opening 431, and fully covers the driving circuit module 3. In some embodiments, the first heat dissipation gel 61 is partially filled in the upper opening 21 and the lower opening 431, and covers a portion of the driving circuit module 3. In a case where the bulb member 4 and the bulb base 2 are connected directly and fixedly by the first heat dissipation gel 61, no mechanical fastening means is required.

The second heat dissipation gel 62 is for heat dissipation and electrical insulation, is disposed in the chamber 20 of the bulb base 2 and is in contact with an inner surface of the bulb base 2 and a bottom surface of the driving circuit module 3. In some embodiments, the second heat dissipation gel 62 is fully filled in the chamber 20. In some embodiments, the second heat dissipation gel 62 is partially filled in the chamber 20 and covers a portion of the bottom surface of the driving circuit module 3. The composition materials or thermal conductivities of the first heat dissipation gel 61 and the second heat dissipation gel 62 may be the same as or different from each other.

When the bulb base 2 is energized, the light-emitting strip modules 501 generate heat as a result of light emission. A majority of the heat is conducted to the bulb base 2 and the bulb member 4 through the second conductive tab 53 of the one of the light-emitting strip modules 501 and the first conductive tab 52 of the another one of the light-emitting strip modules 501 by thermal conduction via the first heat dissipation gel 61 and the second heat dissipation gel 62, and is dissipated outwardly. In addition, a small portion of the heat is dissipated outwardly from the light-emitting strip modules 501 by thermal radiation. Since the bulb base 2 is made of metal, a thermal conductivity thereof is relatively high so a heat dissipation rate thereof is relatively high.

In the present disclosure, heat dissipation is mainly achieved by the first heat dissipation gel 61 and the bulb base 2, so additional processes such as filling a protective gas into the bulb member 4 and sealing the bulb member 4 to the bulb base 2 are not required, and an operating temperature of the present disclosure may be controlled within a certain safe range.

Figure 6:
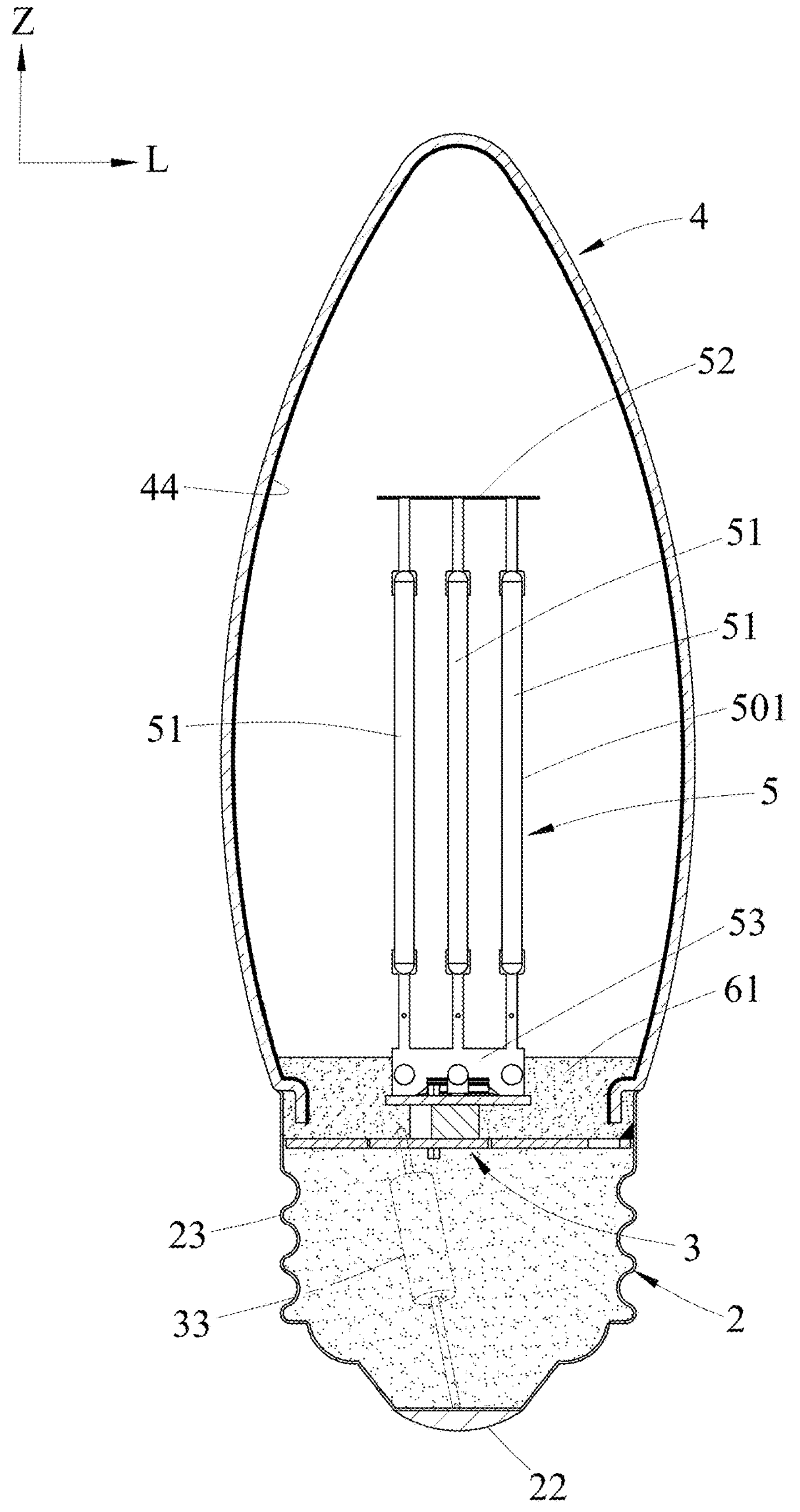
FIG. 6 is a sectional view of a second embodiment of the LED filament light bulb according to the present disclosure.
Figure 7:
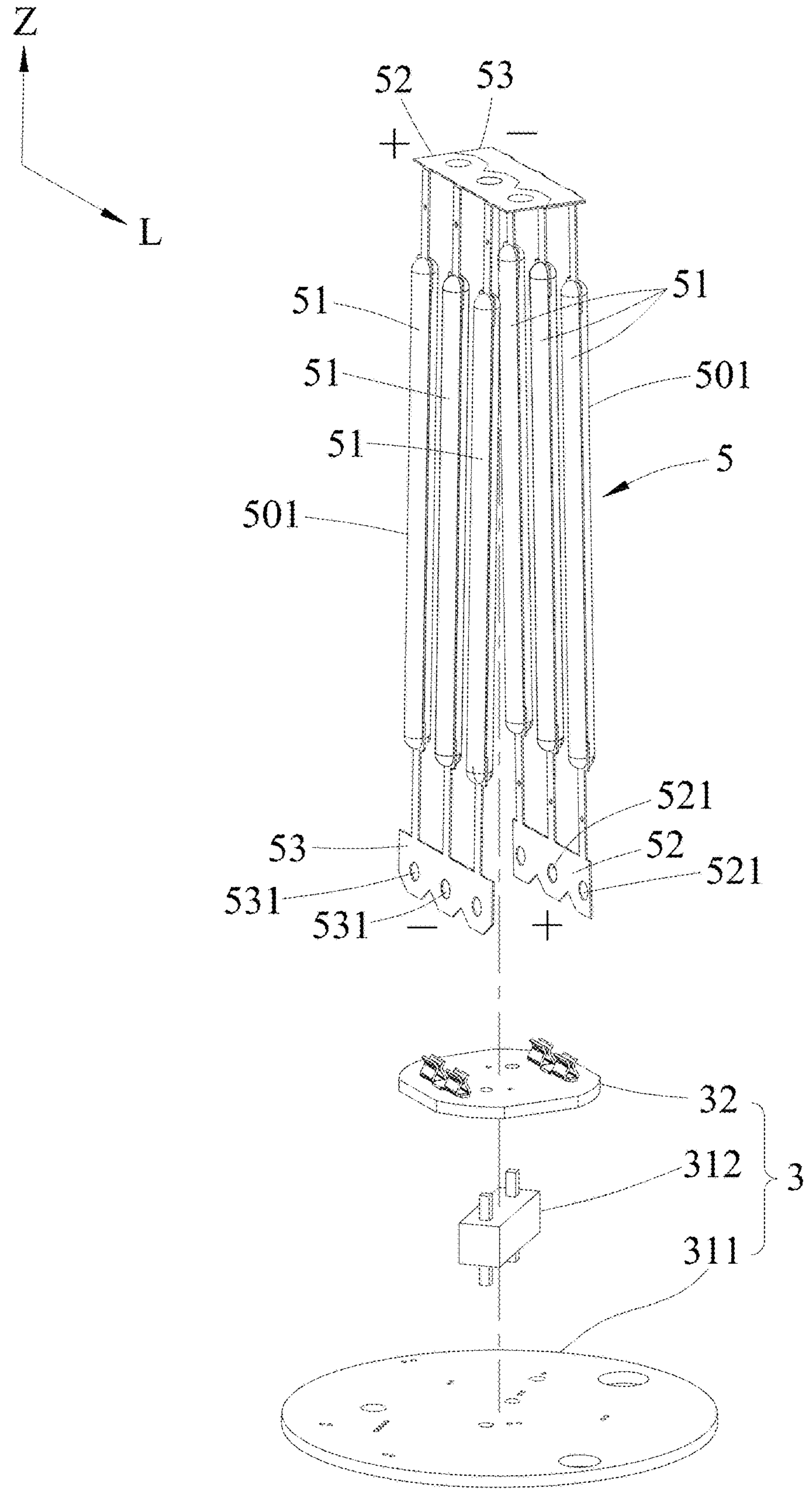
FIG. 7 is an exploded perspective view of a driving circuit module and a light-emitting unit of the second embodiment.

Referring to FIGS. 6 and 7, a second embodiment of the LED filament light bulb according to the present disclosure is similar to the first embodiment, and the differences therebetween reside in the following.

In the second embodiment, each of the light-emitting strip modules 501 includes three LED lighting strips 51. That is to say, the light-emitting unit 5 includes six LED lighting strips 51. Thus, luminance of the second embodiment is greater than that of the first embodiment.

The bulb member 4 further includes an explosion proof layer 44 disposed on an inner side of the bulb member 4. In a case where the bulb member 4 is broken, pieces of the bulb member 4 may be prevented from splashing, thereby providing a relatively high safety.

Figure 8:
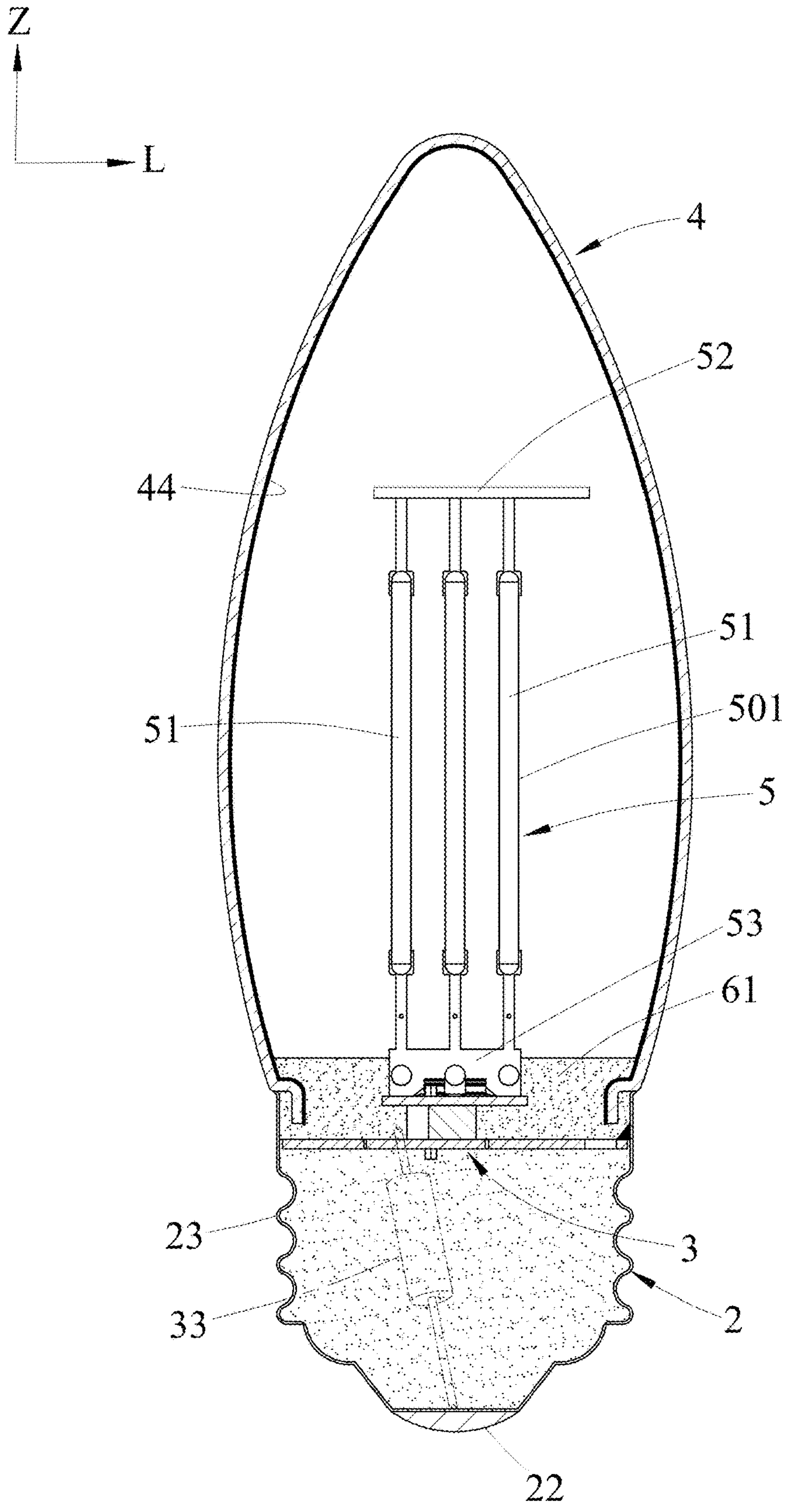
FIG. 8 is a sectional view of a third embodiment of the LED filament light bulb according to the present disclosure.
Figure 9:
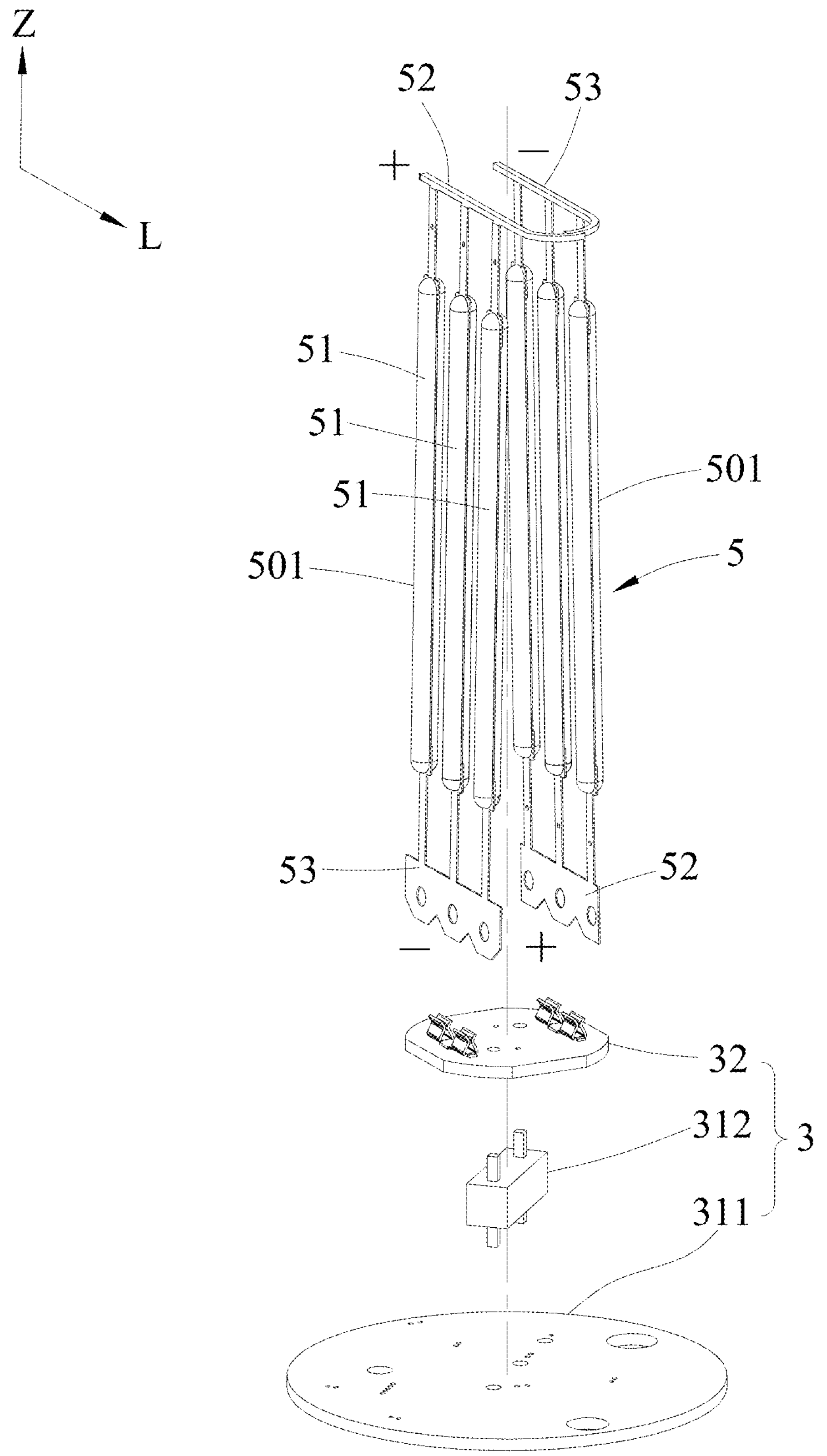
FIG. 9 is an exploded perspective view of a driving circuit module and a light-emitting unit of the third embodiment.

Referring to FIGS. 8 and 9, a third embodiment of the LED filament light bulb according to the present disclosure is similar to the second embodiment, and the differences therebetween reside in the following.

In this embodiment, one lateral side of the first conductive tab 52 of the one of the light-emitting strip modules 501 and one lateral side of the second conductive tab 53 of the another one of the light-emitting strip modules 501 are bent and are connected to each other by welding, such that the first conductive tab 52 of the one of the light-emitting strip modules 501 and the second conductive tab 53 of the another one of the light-emitting strip modules 501 cooperatively form a substantially U-shaped structure. To facilitate bending and welding of the first conductive tab 52 of the one of the light-emitting strip modules 501 and the second conductive tab 53 of the another one of the light-emitting strip modules 501, a portion of the first conductive tab 52 of the one of the light-emitting strip modules 501 that is formed with the through holes 521 and a portion of the second conductive tab 53 of the another one of the light-emitting strip modules 501 that is formed with the through holes 531 (see FIG. 7) are first cut away, so the first conductive tab 52 of the one of the light-emitting strip modules 501 and the second conductive tab 53 of the another one of the light-emitting strip modules 501 may be bent easily.

Figure 10:
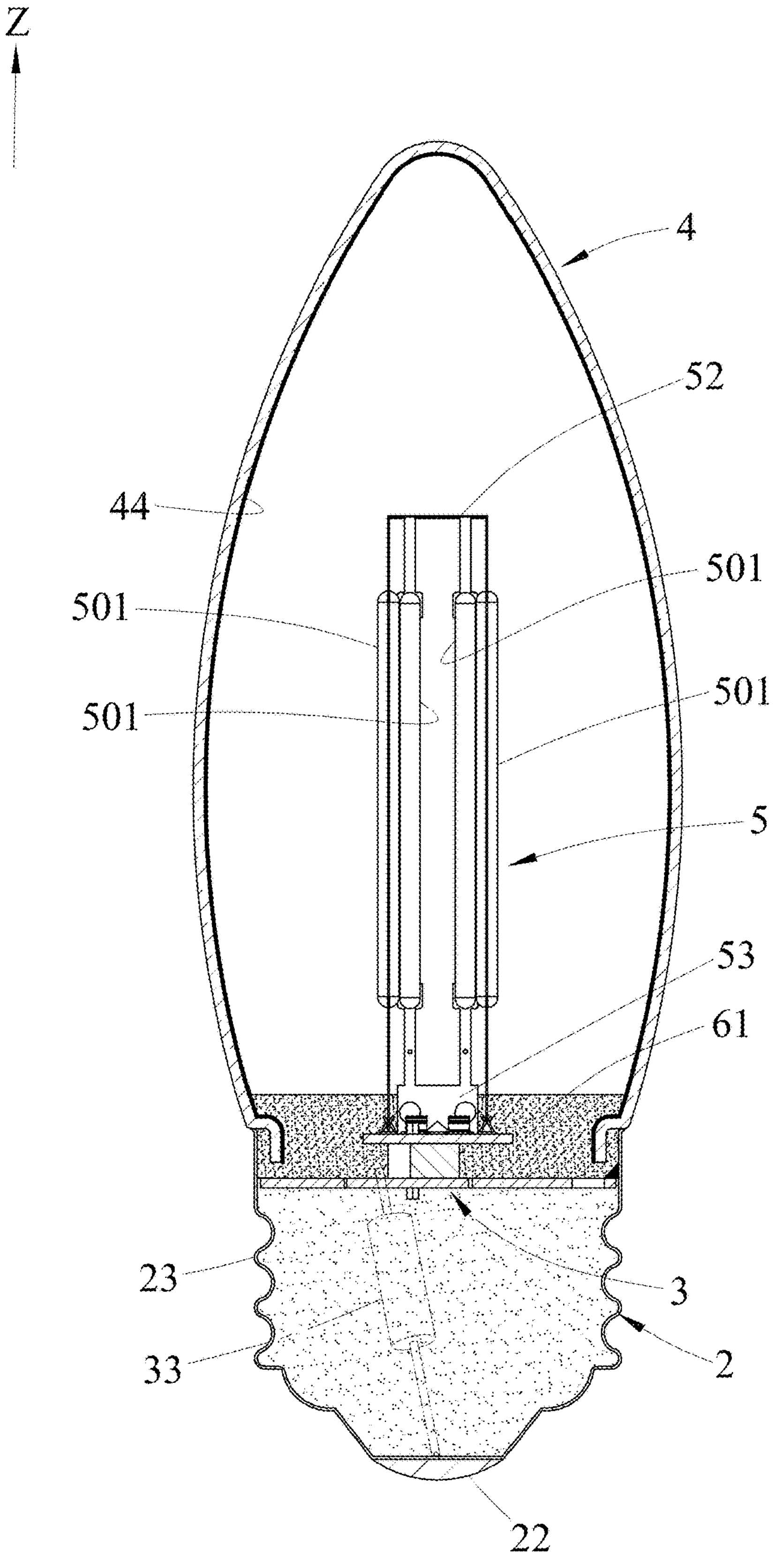
FIG. 10 is a sectional view of a fourth embodiment of the LED filament light bulb according to the present disclosure.
Figure 11:
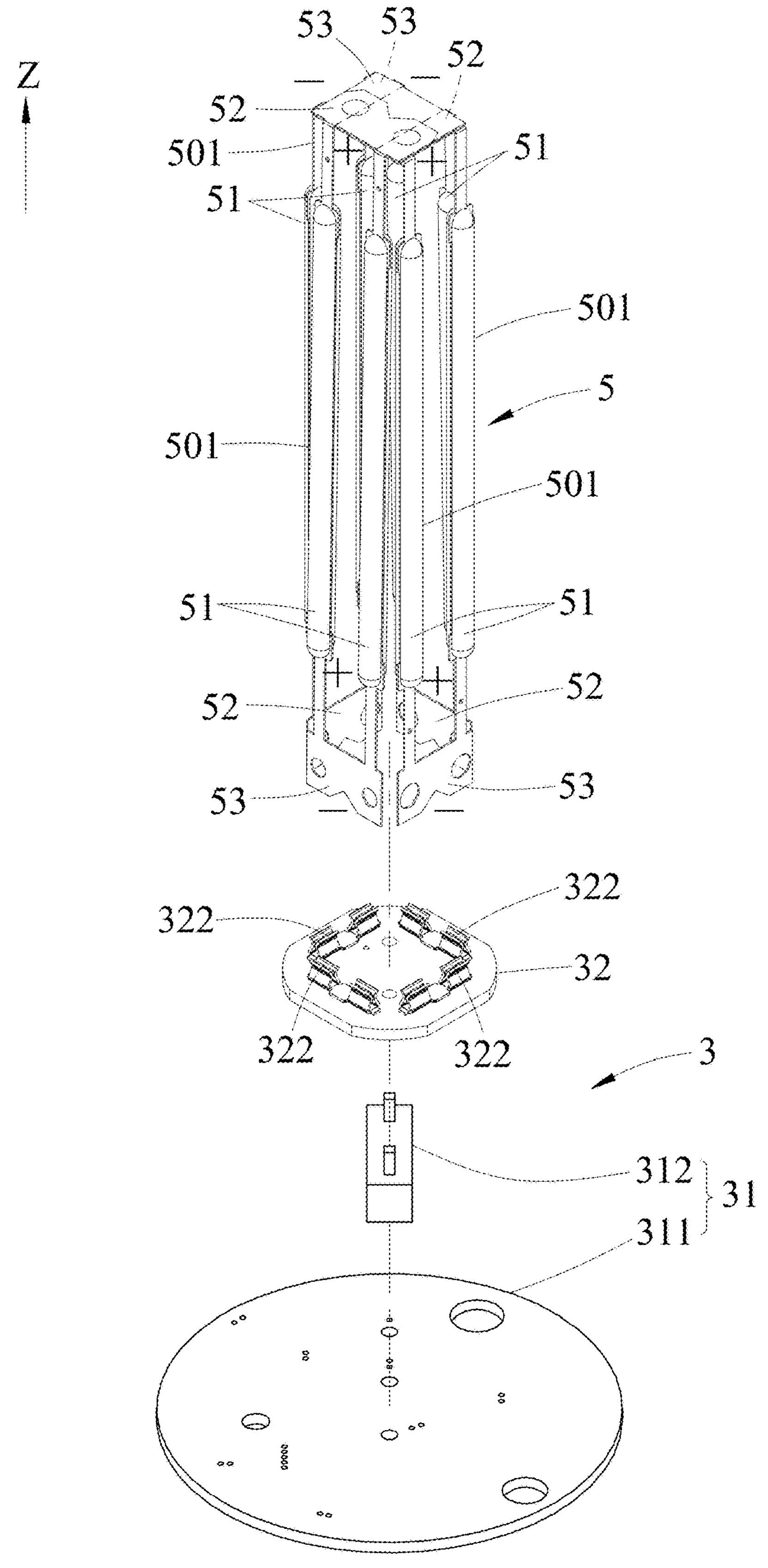
FIG. 11 is an exploded perspective view of a driving circuit module and a light-emitting unit of the fourth embodiment.

Referring to FIGS. 10 and 11, a fourth embodiment of the LED filament light bulb according to the present disclosure is similar to the first embodiment, and the differences therebetween reside in the following.

In the fourth embodiment, the driving circuit module 3 includes four electrical contacts 322.

The light-emitting unit 5 includes four light-emitting strip modules 501 arranged in a rectangular shape. That is to say, the light-emitting unit 5 includes eight LED lighting strips 51. Thus, luminance of the fourth embodiment is greater than those of the first to the third embodiments.

The first conductive tabs 52 of two of the light-emitting strip modules 501 are electrically and fixedly connected to and are overlapped to the second conductive tabs 53 of another two of the light-emitting strip modules 501. The second conductive tabs 53 of the two of the light-emitting strip modules 501 and the first conductive tabs 52 of the another two of the light-emitting strip modules 501 are respectively and fixedly connected to the electrical contacts 322.

The bulb member 4 further includes an explosion proof layer 44 disposed on an inner side of the bulb member 4. In a case where the bulb member 4 is broken, pieces of the bulb member 4 may be prevented from splashing, thereby providing a relatively high safety.

Figure 12:
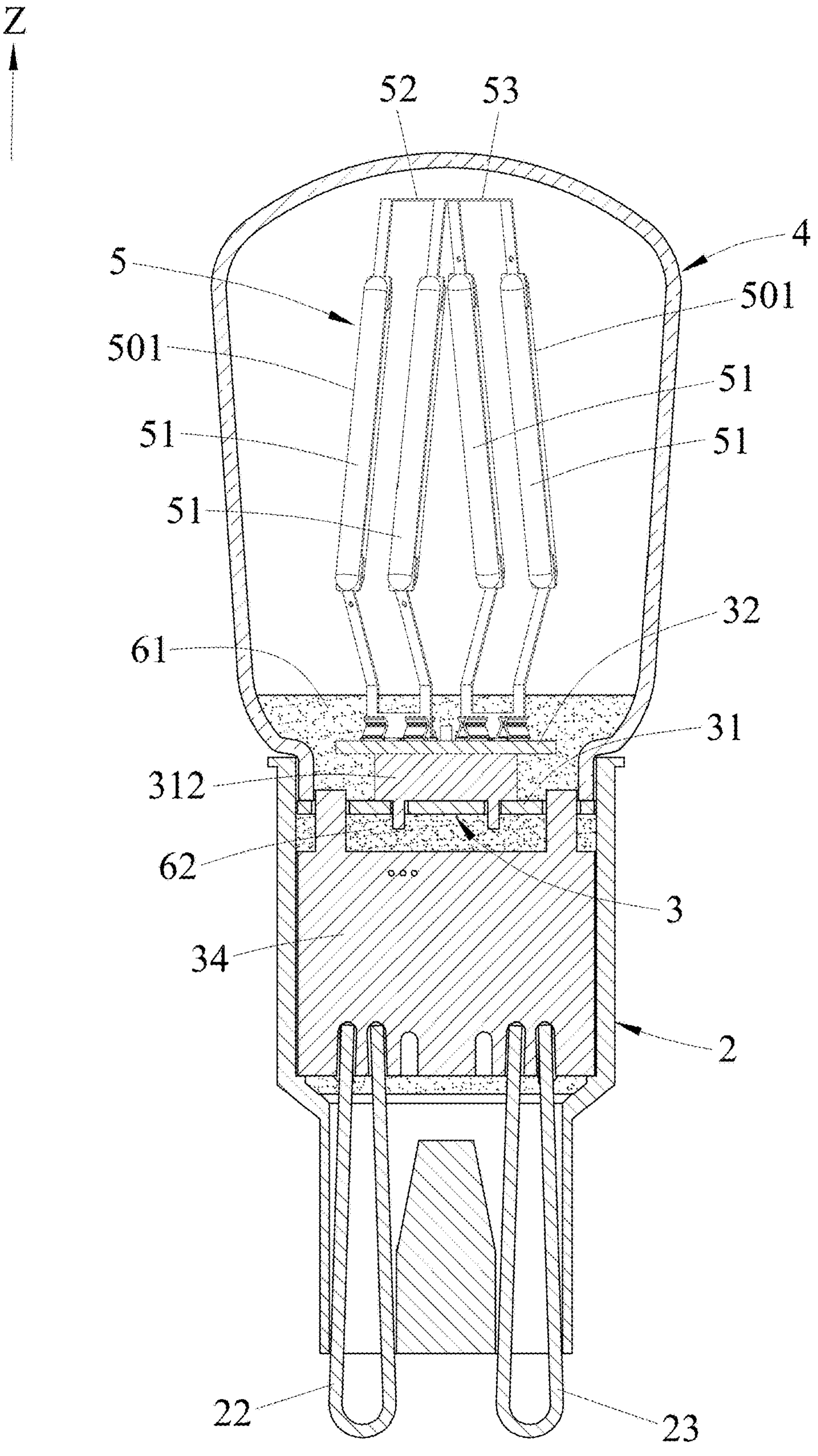
FIG. 12 is a sectional view of a fifth embodiment of the LED filament light bulb according to the present disclosure.

Referring to FIG. 12, a fifth embodiment of the LED filament light bulb according to the present disclosure is similar to the first embodiment, and the differences therebetween reside in the following.

In the fifth embodiment, the bulb base 2 is a pin-type G9 bulb base, and each of the first electrode 22 and the second electrode 23 is a metal pin extending downwardly in the up-down direction (Z).

In this embodiment, the electronic component 33 (see FIG. 4) is omitted. The driving circuit module 3 further includes a connecting member 34 that is disposed uprightly in the bulb base 2 in the up-down direction (Z), that is electrically connected to a bottom portion of the driving circuit board 31, and that is electrically connected to the first electrode 22 and the second electrode 23.

The bulb member 4 has a sky lantern shape. The LED lighting strips 51 are bent.

Figure 13:
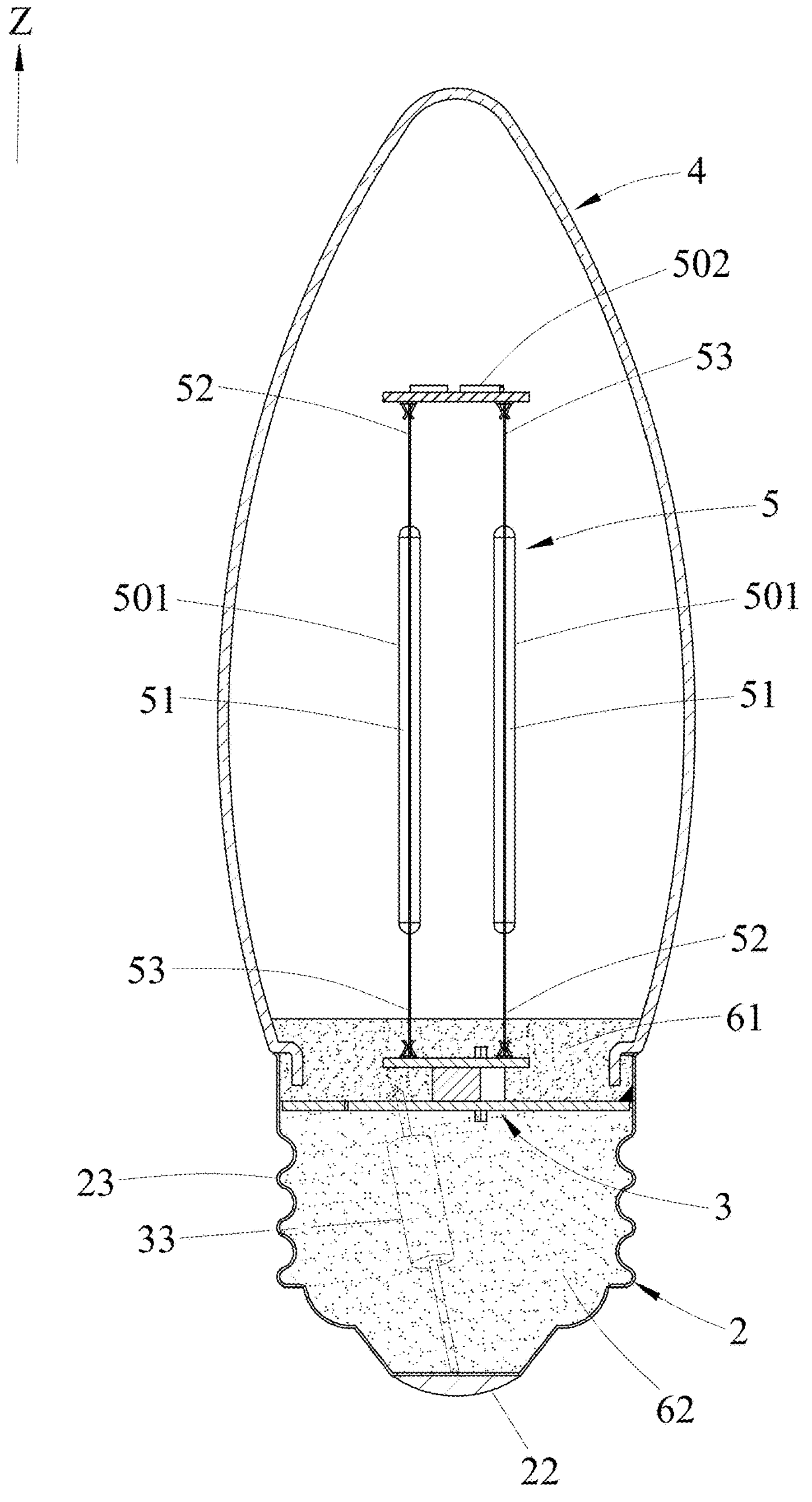
FIG. 13 is a sectional view of a sixth embodiment of the LED filament light bulb according to the present disclosure.
Figure 14:
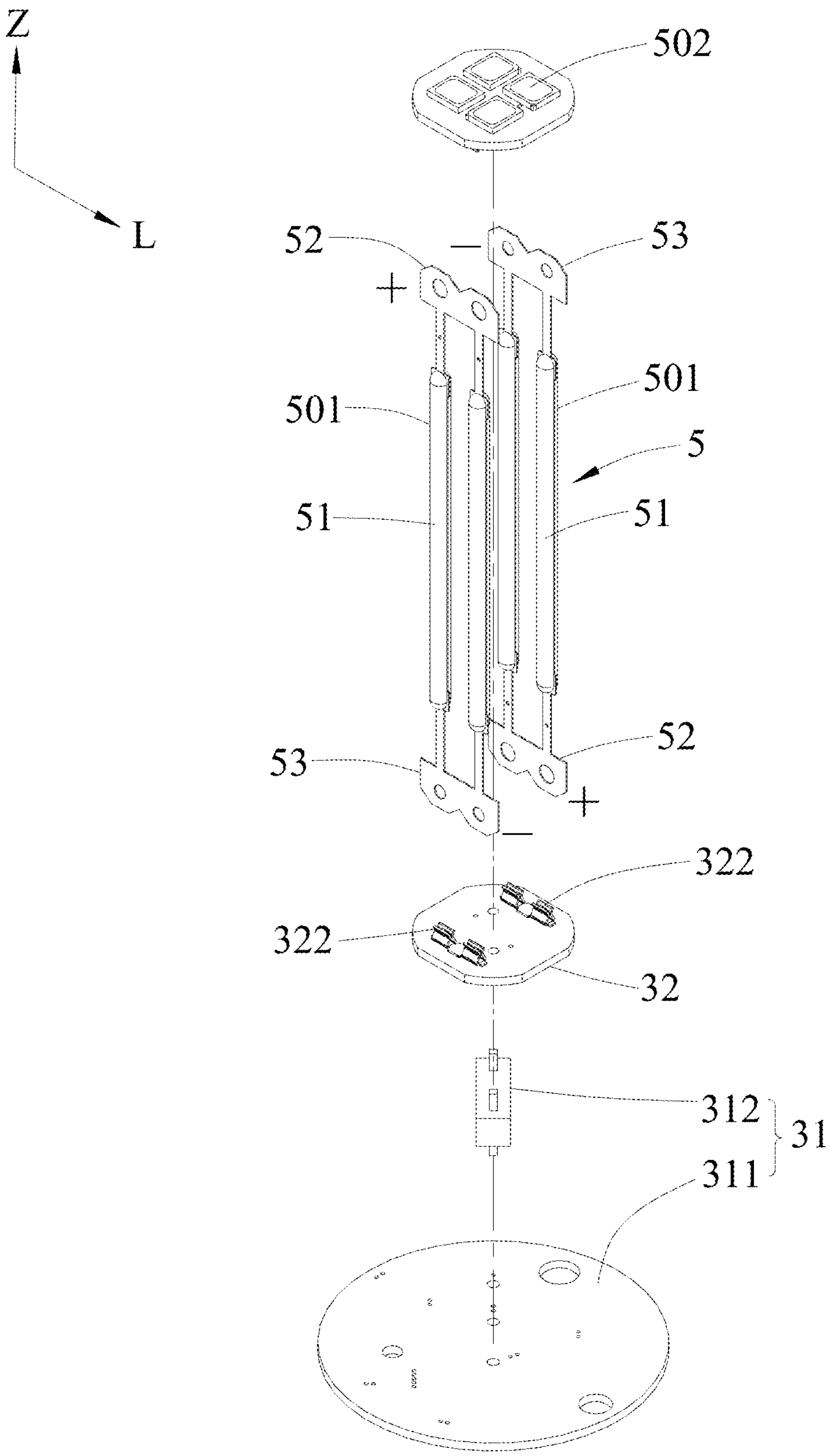
FIG. 14 is an exploded perspective view of a driving circuit module and a light-emitting unit of the sixth embodiment.

Referring to FIGS. 13 and 14, a sixth embodiment of the LED filament light bulb according to the present disclosure is similar to the first embodiment, and the differences therebetween reside in the following.

In the sixth embodiment, the light-emitting unit 5 further includes an upper light-emitting module 502 disposed higher than the light-emitting strip modules 501 in the up-down direction (Z). The first conductive tab 52 of one of the light-emitting strip modules 501 and the second conductive tab 53 of another one of the light-emitting strip modules 501 are respectively and fixedly connected to opposite sides of the upper light-emitting module 502 and are electrically connected to each other. The upper light-emitting module 502 may be a surface mount device (SMD) LED or a chip on board (COB) LED. By virtue of the configuration of the upper light-emitting module 502 that emits light upwardly, upward luminance of this embodiment may be increased as compared to other embodiments of the present disclosure.

Since the first conductive tab 52 of the one of the light-emitting strip modules 501 and the second conductive tab 53 of the another one of the light-emitting strip modules 501 are respectively and fixedly connected to the opposite sides of the upper light-emitting module 502, the light-emitting unit 5 can stand firmly on the driving circuit module 3 without being supported by the core column as disclosed in the abovementioned conventional LED filament light bulb, and the structure of the present disclosure is relative simple.

In summary, in the LED filament light bulb of the present disclosure, by virtue of the first conductive tab 52 of one of the light-emitting strip modules 501 and the second conductive tab 53 of another one of the light-emitting strip modules 501 being connected fixedly to each other, or being respectively and fixedly connected to the opposite sides of the upper light-emitting module 502, the LED lighting strips 51 can stand firmly on the driving circuit module 3, so the core column as disclosed in the abovementioned conventional LED filament light bulb is not required, and the structure of the present disclosure is relative simple. In addition, the LED filament light bulb of the present disclosure utilizes the first heat dissipation gel 61 and the bulb base 2 to dissipate heat, so it is not necessary to fill a protective gas for heat dissipation in the bulb member 4. The structure of this disclosure is relatively simple and the manufacturing process involves fewer steps than that the conventional LED filament light bulb, thereby increasing the production rate. Therefore, the object of the present disclosure may indeed be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light-emitting diode (LED) filament light bulb comprising:

a bulb base that defines a chamber having an upper opening, and that includes a first electrode and a second electrode;

a driving circuit module that is mounted to said bulb base, that is electrically connected to said first electrode and said second electrode, and that has at least two electrical contacts;

a bulb member that is mounted to said bulb base, that defines a lighting space adapted for accommodating air therein, and that has a lower opening in spatial communication with said lighting space and aligned with said upper opening of said bulb base;

a light-emitting unit that is electrically connected to said driving circuit module, that extends into said lighting space, and that includes at least two light-emitting strip modules, each of said at least two light-emitting strip modules including a plurality of LED lighting strips that are spaced apart from each other and that are disposed in said lighting space, a first conductive tab that is connected to a first end portion of each of said LED lighting strips, and a second conductive tab that is connected to a second end portion of each of said LED lighting strips, said first conductive tab of one of said at least two light-emitting strip modules being fixedly and electrically connected to said second conductive tab of another one of said at least two light-emitting strip modules, said second conductive tab of said one of said at least two light-emitting strip modules being electrically connected to one of said at least two electrical contacts, said first conductive tab of said another one of said at least two light-emitting strip modules being electrically connected to another one of said at least two electrical contacts; and a first heat dissipation gel that is disposed between said bulb member and said bulb base, that is filled in at least a portion of said upper opening and at least a portion of said lower opening, that covers at least a portion of said driving circuit module, and that is for electrical insulation and heat dissipation;

wherein said first heat dissipation gel further covers at least a portion of said second conductive tab of said one of said at least two light-emitting strip modules that is electrically connected to said one of said at least two electrical contacts, and at least a portion of said first conductive tab of said another one of said at least two light-emitting strip modules that is electrically connected to said another one of said at least two electrical contacts.

2. The LED filament light bulb as claimed in claim 1, further comprising a second heat dissipation gel disposed in said chamber of said bulb base and in contact with an inner surface of said bulb base.

3. The LED filament light bulb as claimed in claim 1, wherein said first conductive tab of said one of said at least two light-emitting strip modules and said second conductive tab of said another one of said at least two light-emitting strip modules are connected to and overlapped to each other.

4. The LED filament light bulb as claimed in claim 1, wherein one side of said first conductive tab of said one of said at least two light-emitting strip modules and one side of said second conductive tab of said another one of said at least two light-emitting strip modules are connected to each other, such that said first conductive tab of said one of said at least two light-emitting strip modules and said second conductive tab of said another one of said at least two light-emitting strip modules cooperatively form a substantially U-shaped structure.

5. The LED filament light bulb as claimed in claim 1, wherein said driving circuit module includes a driving circuit board electrically connected to said first electrode and said second electrode, and an adapter board electrically connected to said driving circuit board, said at least two electrical contacts being formed on said adapter board.

6. The LED filament light bulb as claimed in claim 5, wherein:

said driving circuit board includes a circuit board body and an insert member inserted into said circuit board body; and said insert member has two conductive pillars electrically and respectively connected to said at least two electrical contacts.

7. The LED filament light bulb as claimed in claim 1, wherein said bulb member includes an explosion proof layer disposed on an inner side of said bulb member.

8. The LED filament light bulb as claimed in claim 1, wherein:

said at least two light-emitting strip modules include four light-emitting strip modules: and said at least two electrical contacts include four electrical contacts respectively and electrically connected to said light-emitting strip modules.

9. The LED filament light bulb as claimed in claim 1, wherein, for each of said at least two light-emitting strip modules:

each of said LED lighting strips has a luminous body configured to emit light, and said first end portion and said second end portion respectively connected to opposite ends of said luminous body;

said first conductive tab and said first end portion of each of said LED lighting strips are formed of a single metal sheet; and said second conductive tab and said second end portion of each of said LED lighting strips are formed of a single metal sheet.

10. The LED filament light bulb as claimed in claim 1, wherein said bulb member includes:

a lower shoulder wall;

a surrounding wall encircling said lower shoulder wall and extending upwardly in an up-down direction; and a flange extending from said lower shoulder wall in a direction opposite to said surrounding wall, said flange defining said lower opening, said flange extending into said upper opening of said bulb base, said lower shoulder wall abutting against a top side of said bulb base in the up-down direction.

11. The LED filament light bulb as claimed in claim 1, wherein each of said first electrode and said second electrode is a metal pin.

12. A light-emitting diode (LED) filament light bulb comprising:

a bulb base that defines a chamber having an upper opening, and that includes a first electrode and a second electrode;

a driving circuit module that is mounted to said bulb base, that is electrically connected to said first electrode and said second electrode, and that has at least two electrical contacts;

a bulb member that is mounted to said bulb base, that defines a lighting space adapted for accommodating air therein, and that has a lower opening in spatial communication with said lighting space and aligned with said upper opening of said bulb base;

a light-emitting unit that is electrically connected to said driving circuit module, that extends into said lighting space, and that includes at least two light-emitting strip modules and an upper light-emitting module disposed higher than said at least two light-emitting strip modules in an up-down direction, each of said at least two light-emitting strip modules including a plurality of LED lighting strips that are spaced apart from each other and that are disposed in said lighting space, a first conductive tab that is connected to a first end portion of each of said LED lighting strips, and a second conductive tab that is connected to a second end portion of each of said LED lighting strips, said first conductive tab of one of said at least two light-emitting strip modules and said second conductive tab of another one of said at least two light-emitting strip modules being fixedly and respectively connected to opposite sides of said upper light-emitting module and being electrically connected to each other, said second conductive tab of said one of said at least two light-emitting strip modules being electrically connected to one of said at least two electrical contacts, said first conductive tab of said another one of said at least two light-emitting strip modules being electrically connected to another one of said at least two electrical contacts; and a first heat dissipation gel that is disposed between said bulb member and said bulb base, that is filled in at least a portion of said upper opening and at least a portion of said lower opening, that covers at least a portion of said driving circuit module, and that is for electrical insulation and heat dissipation;

wherein said first heat dissipation gel further covers at least a portion of said second conductive tab of said one of said at least two light-emitting strip modules that is electrically connected to said one of said at least two electrical contacts, and at least a portion of said first conductive tab of said another one of said at least two light-emitting strip modules that is electrically connected to said another one of said at least two electrical contacts.

* * * * *